United States Patent
Nande et al.

(10) Patent No.: US 9,616,396 B2
(45) Date of Patent: Apr. 11, 2017

(54) MIXING ASSEMBLY FOR REDUCING EXHAUST REDUCTANT DEPOSITS

(71) Applicant: Cummins Emission Solutions, Inc., Columbus, IN (US)

(72) Inventors: Abhijeet Nande, Columbus, IN (US); Pramod Kisan Patil, Pune (IN); Swapnil Khachane, Columbus, IN (US); Sandesh Sadawarte, Parbhani (IN)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 1 day.

(21) Appl. No.: 14/708,752

(22) Filed: May 11, 2015

(65) Prior Publication Data
US 2016/0332126 A1    Nov. 17, 2016

(51) Int. Cl.
| | |
|---|---|
| *F01N 13/08* | (2010.01) |
| *B01F 5/06* | (2006.01) |
| *F01N 3/20* | (2006.01) |
| *F01N 3/28* | (2006.01) |
| *B01F 5/02* | (2006.01) |

(Continued)

(52) U.S. Cl.
CPC ........ *B01F 5/0602* (2013.01); *B01F 3/04007* (2013.01); *B01F 3/04049* (2013.01); *B01F 5/0268* (2013.01); *B01F 5/0473* (2013.01); *B01F 5/0618* (2013.01); *F01N 3/2066* (2013.01); *F01N 3/2892* (2013.01); *B01F 2005/0639* (2013.01); *B01F 2215/0422* (2013.01); *B01F 2215/0431* (2013.01); *F01N 2240/20* (2013.01); *F01N 2610/02* (2013.01); *F01N 2610/1453* (2013.01); *Y02T 10/24* (2013.01)

(58) Field of Classification Search
CPC .. B01F 3/04049; B01F 5/0268; B01F 5/0618; B01F 2215/0422; B01F 2215/0431; F01N 3/2066; F01N 3/2892; F01N 2240/20; F01N 2610/02; F01N 2610/1453
USPC .................. 60/286, 295, 301, 310, 317, 324
See application file for complete search history.

(56) References Cited

U.S. PATENT DOCUMENTS

| | | |
|---|---|---|
| 6,449,947 B1 | 9/2002 | Liu et al. |
| 6,601,385 B2 | 8/2003 | Verdegan et al. |
| 7,448,206 B2 | 11/2008 | Meingast et al. |

(Continued)

FOREIGN PATENT DOCUMENTS

EP    1 990 513    11/2008

Primary Examiner — Jorge Leon, Jr.
(74) Attorney, Agent, or Firm — Foley & Lardner LLP (57) ABSTRACT

An aftertreatment system comprises a SCR system. A mixing assembly is positioned upstream of the SCR system and includes a housing defining a flow path for an exhaust gas. An injection port is defined on a first sidewall of the housing and oriented at a predetermined angle relative to a longitudinal axis of the flow path. A mixer is positioned within the flow path downstream of the injection port and includes a plurality of plates each positioned in the flow path. A first plate is positioned distal to the injection port and adjacent to a second sidewall of the housing opposite to the first sidewall. The first plate has a first length substantially longer than a length of the other plates and extends in a direction upstream of the mixer. An exhaust reductant injector is positioned on the first sidewall of the housing proximal to the injection port.

16 Claims, 8 Drawing Sheets

(51) Int. Cl.
B01F 5/04 (2006.01)
B01F 3/04 (2006.01)

(56) References Cited

U.S. PATENT DOCUMENTS

| | | |
|---|---|---|
| 8,359,832 B2 | 1/2013 | Yi et al. |
| 8,615,984 B2 | 12/2013 | Kornherr et al. |
| 2008/0295497 A1* | 12/2008 | Kornherr ............... B01D 53/90 60/286 |
| 2009/0019843 A1* | 1/2009 | Levin .................. B01F 3/04049 60/303 |
| 2009/0262599 A1* | 10/2009 | Kohrs ................... B01F 5/0643 366/337 |
| 2011/0146254 A1* | 6/2011 | Yi ....................... B01F 3/04049 60/310 |
| 2012/0073272 A1* | 3/2012 | Vanvolsem ......... B01F 3/04049 60/295 |
| 2012/0227390 A1* | 9/2012 | Wikaryasz ................ F01N 3/28 60/324 |
| 2013/0010453 A1 | 1/2013 | Mahowald |
| 2015/0040547 A1* | 2/2015 | Brockman ............ F01N 3/2892 60/324 |

\* cited by examiner

MIXING ASSEMBLY FOR REDUCING EXHAUST REDUCTANT DEPOSITS

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst to convert NOx (NO and $NO_2$ in some fraction) into harmless nitrogen gas ($N_2$) and water vapor ($H_2O$) in the presence of ammonia ($NH_3$). Generally in such conventional aftertreatment systems, an exhaust reductant, (e.g., a diesel exhaust fluid such as urea) is injected into the aftertreatment system to provide a source of ammonia, and mixed with the exhaust gas to partially reduce the NOx gases. The reduction byproducts of the exhaust gas are then fluidically communicated to the catalyst included in the SCR aftertreatment system to decompose substantially all of the NOx gases into relatively harmless byproducts which are expelled out of such conventional SCR aftertreatment systems.

In conventional SCR systems for the aftertreatment of exhaust gas (e.g., diesel exhaust gas), an exhaust reductant (e.g., a source of ammonia such as urea) is inserted into the SCR system to facilitate reduction of NOx gases included in the exhaust gas of IC engines (e.g., diesel exhaust gas). The exhaust reductant inserted into the SCR system can impinge the sidewalls of the SCR system and be deposited on a sidewall of the SCR system in the form of solid crystals (e.g., stalagmite and/or stalactite) crystals. Such solid deposits can decrease the flow path of the exhaust gas, produce unwanted turbulence, increase the backpressure of the exhaust gas, which can lead to decreased fuel efficiency and eventual failure of the aftertreatment system.

SUMMARY

Embodiments described herein relate generally to a mixing assembly included in an aftertreatment system that includes a mixer for reducing exhaust reductant deposits in the mixing assembly. Various embodiments of the mixer described herein include a plurality of plates positioned such that an exhaust reductant inserted into the mixing assembly impacts only the mixer and is prevented from impacting the sidewalls of the mixing assembly by the mixer.

In a first set of embodiments, an aftertreatment system comprises a SCR system configured to receive an exhaust gas. The SCR system includes at least one catalyst formulated to reduce constituents of the exhaust gas in the presence of an exhaust reductant. A mixing assembly is positioned upstream of the selective catalytic reduction system. The mixing assembly includes a housing defining a flow path for the exhaust gas to flow therethrough. An injection port is defined on a first sidewall of the housing. The injection port is oriented at a predetermined angle relative to a longitudinal axis of the flow path. A mixer is positioned within the flow path of the housing downstream of the injection port. The mixer includes a plurality of plates each positioned in the flow path of the exhaust gas. A first plate of the plurality of plates is positioned distal to the injection port and adjacent to a second sidewall of the housing opposite to the first sidewall. The first plate has a first length substantially longer than a length of at least one of the other plates in the plurality of plates. The first plate extends in a direction upstream of the mixer. An exhaust reductant injector is positioned on the first sidewall of the housing proximal to the injection port and is in fluidic communication with the flow path via the injection port.

In another set of embodiments, a mixing assembly comprises a housing defining a flow path for an exhaust gas to flow therethrough. An injection port is defined on a first sidewall of the housing. The injection port is oriented at a predetermined angle relative to a longitudinal axis of the flow path. A mixer is positioned within the flow path of the housing downstream of the injection port. The mixer includes a plurality of plates positioned in the flow path of the exhaust gas. A first plate of the plurality of plates is positioned distal to the injection port and adjacent to a second sidewall of the housing opposite to the first sidewall. The first plate has a first length substantially longer than a length of at least one other plate of the plurality of plates. The first plate extends in a direction upstream of the mixer.

In yet another set of embodiments, a mixer for positioning in a mixing assembly for mixing an exhaust reductant with an exhaust gas comprises a plurality of plates is provided. A first plate of the plurality of plates has a first length which is substantially longer than a length of at least one other plate of the plurality of plates. The mixer is configured to be positioned in a flow path of the exhaust gas flowing through the mixing assembly such that an exhaust reductant inserted via an injection portion defined on a first sidewall of a housing of the mixing assembly at a predetermined angle is directed towards a center of the mixing assembly. The first plate is located distal from the injection port and adjacent to a second sidewall of a housing of the mixing assembly opposite the first sidewall. The first plate extends in a direction upstream of the mixer.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to a mixing assembly included in an aftertreatment system that includes a mixer for reducing exhaust reductant deposits in the mixing assembly. Various embodiments of the mixer described herein include a plurality of plates positioned such that an exhaust reductant inserted into the mixing assembly impacts only the mixer and is prevented from impacting the sidewalls of the mixing assembly by the mixer.

Various embodiments of the mixings assembly and mixer described herein may provide several benefits including, for example: (1) inserting exhaust reductant at a predetermined angle to ensure that the exhaust reductant only impacts the mixer; (2) severely inhibiting or preventing exhaust reductant inserted into the mixing assembly from impacting on a sidewall of the mixing assembly; (3) reducing reductant deposits, thereby preventing or significantly inhibiting an increase of backpressure which can lead to failure of the SCR system; (3) providing compatibility with exhaust assemblies and/or SCR systems.

Figure 1:
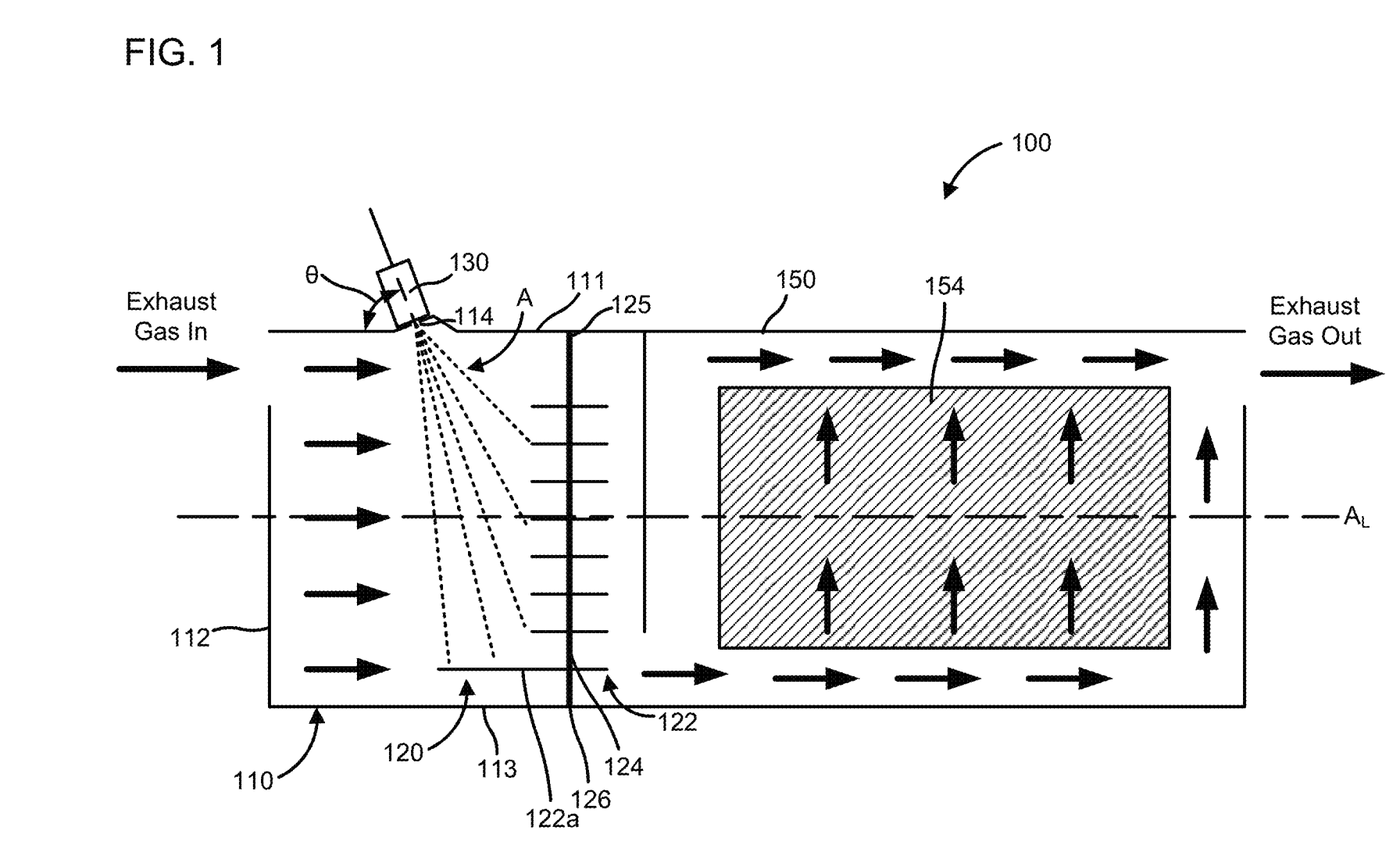
FIG. 1 is a schematic illustration of a side cross-section of an aftertreatment system that includes a mixing assembly, according to an embodiment.

FIG. 1 is a schematic illustration of a side cross-section of an aftertreatment system 100 for treating an exhaust gas (e.g., a diesel exhaust gas) produced by an IC engine (e.g., a diesel engine). The aftertreatment system 100 includes an SCR system 150 and a mixing assembly 110.

The SCR system 150 is configured to receive and treat the exhaust gas (e.g., a diesel exhaust gas) flowing through the SCR system 150. The SCR system 150 includes one or more catalysts 154 formulated to selectively reduce constituents of the exhaust gas, for example, NOx included in the exhaust gas in the presence of an exhaust reductant. Any suitable catalyst 154 can be used such as, for example, platinum, palladium, rhodium, cerium, iron, manganese, copper, vanadium based catalysts (including combinations thereof).

The catalyst 154 can be disposed on a suitable substrate such as, for example, a ceramic (e.g., cordierite) or metallic (e.g., kanthal) monolith core which can, for example, define a honeycomb structure. A washcoat can also be used as a carrier material for the catalyst 154. Such washcoat materials can include, for example, aluminum oxide, titanium dioxide, silicon dioxide, any other suitable washcoat material, or a combination thereof. The exhaust gas can flow over and about the catalyst 154 such that any NOx gases included in the exhaust gas are further reduced to yield an exhaust gas which is substantially free of carbon monoxide and NOx gases.

The mixing assembly 110 is positioned upstream of the SCR system 150. The mixing assembly 110 is configured to receive the exhaust gas from the engine, as well as an exhaust reductant. The mixing assembly facilitates mixing of the exhaust reductant with the exhaust gas to form a gaseous mixture which is communicated to the SCR system 150. The exhaust reductant is formulated to facilitate reduction of the constituents of the exhaust gas (e.g., NOx) by the catalyst 154 included in the SCR system 150. In embodiments in which the exhaust gas is a diesel exhaust gas, the exhaust reductant can include a diesel exhaust fluid (DEF) which provides a source of ammonia. Suitable DEFs can include urea, aqueous solution of urea or any other DEF (e.g., the DEF available under the tradename ADBLUE®).

The mixing assembly 110 includes a housing 112 defining a flow path for the exhaust gas to flow therethrough. The housing 112 can be formed from any suitable material (e.g., aluminum, stainless steel, etc.) and can have any suitable cross-section (e.g., round, oval, square, rectangular, polygonal, etc.). In one embodiment, the housing 112 can be shaped in the form of a tube having a predetermined diameter (e.g., in the range of 2 inches to 5 inches). In one particular embodiment, the diameter is 3 inches.

An injection port 114 is defined on a first sidewall 111 of the housing 112. The injection port 114 is oriented at a predetermined angle $\theta$ relative to a longitudinal axis $A_L$ of the flow path, as shown in FIG. 1. An exhaust reductant injector 130 is positioned on the first sidewall 111 of the housing 112 proximal to the injection port 114 and in fluidic communication with the flow path via the injection port 114. The exhaust reductant injector 130 is configured to insert the exhaust reductant into the flow path as shown by the arrow A.

The predetermined angle $\theta$ is used to direct the flow of the exhaust reductant towards a center of a mixer 120 included in the mixing assembly 110 so that all or substantially all of the exhaust reductant impacts the mixer 120. Expanding further, the exhaust reductant is inserted at the predetermined angle $\theta$ such that an exhaust reductant spray cone shown by the arrow A, which forms once the exhaust reductant is inserted into the flow path via the injection port 114, impacts the mixer 120. The mixer 120 prevents the exhaust reductant from impacting a second sidewall 113 of the housing 112 as described herein. In particular embodiments, the predetermined angle $\theta$ is 36 degrees. However, any suitable insertion angle can be used which ensures that the spray cone of the exhaust reductant only impacts the mixer 120.

Figure 2:
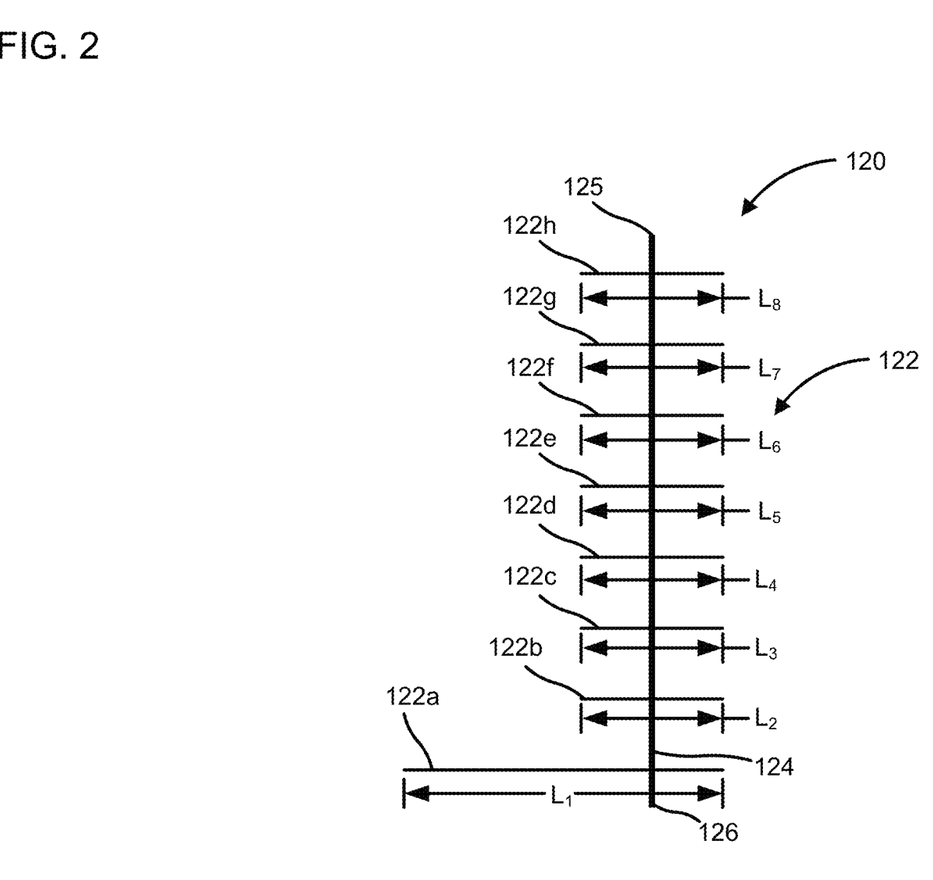
FIG. 2 is an illustration of one embodiment of a mixer included in the mixing assembly of FIG. 1.

The mixer 120 is positioned within the flow path of the exhaust gas downstream of the injection port 114. FIG. 2 shows an enlarged view of the mixer 120 of FIG. 1. The mixer 120 includes a plurality of plates 122 each positioned in the flow path of the exhaust gas. While shown as including 8 plates 122a to 122e in FIG. 2, the precise number of plates 122 in the mixer 120 can vary based upon factors such as the overall size of the mixer 120. In particular embodiments, each of the plurality of plates 122 can be positioned parallel to each other. In other embodiments, the plates 122 can be oriented at any predetermined angle relative to each other, and the angle between two of the plates 122 can be different than the angle between another set of two plates 122. Each of the plurality of plates 122 can be equidistantly spaced from each other. In other embodiments, however, the spacings between adjacent plates 122 can vary.

A post 124 is coupled to each of the plurality of plates 122. The post 124 extends orthogonal to the plurality of plates 122. A first end 125 of the post 124 is mounted on the first sidewall 111 of the housing 112, and a second end 126 of the post 124 is mounted on the second sidewall 113 of the housing 112. In this manner, the post 124 is configured to position the plates 122 in the flow path of the exhaust gas. The plates 122 and the post 124 can be formed from any suitable material (e.g., aluminum or stainless steel).

A width of the plates 122 can be defined to follow a contour of an inner surface of the housing 112. For example, the housing 112 can have a circular cross-section. The widths of the plates 122 can be extended from the post 124 to the inner surface of the housing 112 orthogonal to the longitudinal axis AL such that the edge of each plate 122 is equidistantly spaced from the inner surface of the housing 112. In other words, the mixer 120 can resemble a circular grill or louvre. In one embodiment, a ring (e.g., a circular ring) can also be positioned around the plates 122 such that the edges of each of the plate 122 orthogonal to the longitudinal axis AL of the plates 122 are coupled to the ring. The ring can, for example, provide structural rigidity and strength to the plates 122.

Referring also now to FIG. 2, a first plate 122a of the plurality of plates 122 is positioned distal to the injection port 114 and adjacent to the second sidewall 113 of the housing 112 opposite the first sidewall 111. The first plate 122a has a length $L_1$ which is substantially longer than the length $L_2$ to $L_8$ of at least one of the other plates 122b to 122h included in the plurality of plates 122. Furthermore, the first plate 122a extends in a direction upstream of the mixer 120 towards the injection port 114.

For example as shown in FIG. 2, the first length $L_1$ of the first plate 122a extending upstream of the mixer 120 is substantially longer than the lengths $L_2$ to $L_8$ of all of the other plates 122b to 122h included in the plurality of plates 122. In particular embodiments, the lengths $L_2$ to $L_8$ of the other plates 122b to 122h can be the same.

As described before, the predetermined angle θ is configured to direct the flow of exhaust reductant towards the center of the mixer 120. The spray cone A of the exhaust reductant can spread such that a portion of the exhaust reductant is directed towards the second sidewall 113 of the housing 112 of the mixing assembly 110. If the liquid exhaust reductant impacts the second sidewall 113, the high temperature of the second sidewall 113 can lead to rapid evaporation of the exhaust reductant, which can lead to formation of crystalline deposits of the exhaust reductant on the second sidewall 113. However, the length L1 of first plate 122a is such that any portion of the spray cone A of the exhaust reductant directed towards the second sidewall 113 and not impacting the plates 122b to 122h, is caught by the first plate 122a and is thereby prevented from impacting the second sidewall 113 of the housing 112. In this manner, formation of exhaust reductant deposits on the second sidewall 113 of the housing 112 can be significantly reduced or otherwise eliminated.

Figure 3:
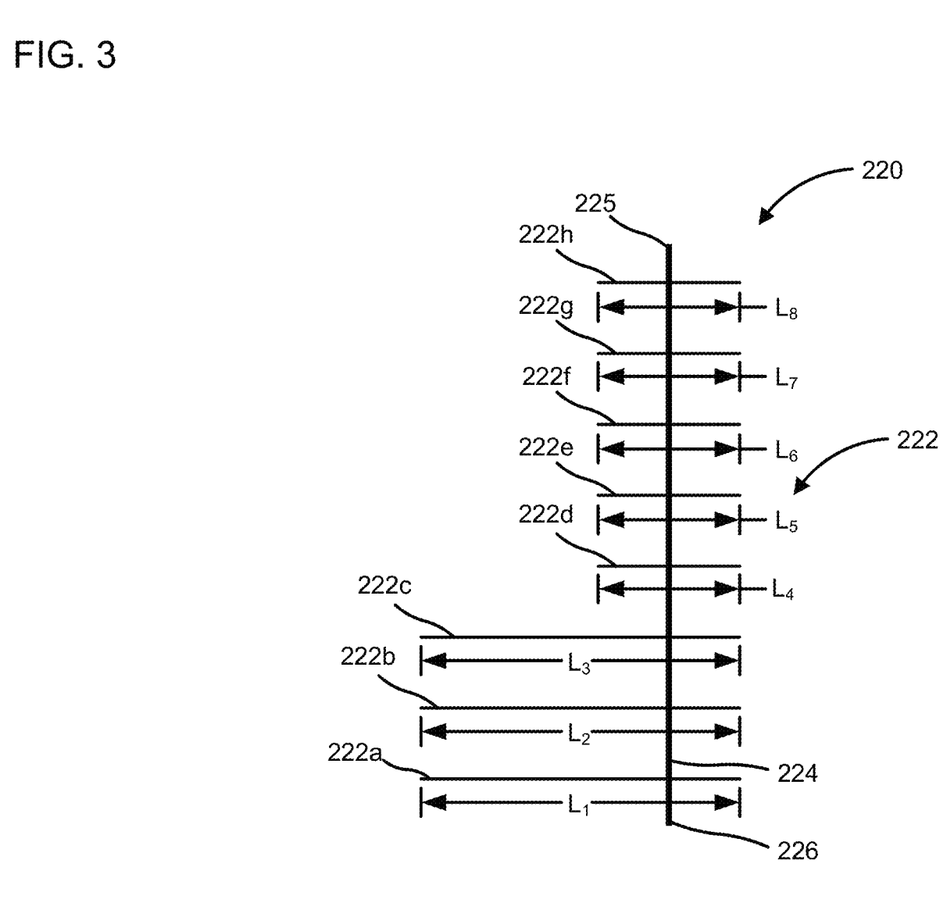
FIG. 3 is an illustration of another embodiment of a mixer that can be included in the mixing assembly of FIG. 1.

In other embodiments, more than one plate included in a mixer can have lengths which are longer than the lengths of the other plates included in the mixer. For example, FIG. 3 shows another embodiment of a mixer 220 which can be included in the mixing assembly 110 of FIG. 1. The mixer 220 includes a plurality of plates 222. While shown in FIG. 3 as including eight plates 222a to 222h, the mixer 220 can include any number of the plates 222. A post 224 is coupled to each of the plurality of plates 222. The post 224 extends orthogonal to the plurality of plates 222. A first end 225 of the post 224 is configured to be mounted on the first sidewall 111 of the housing 112, and a second end 226 of the post 224 is configured to be mounted on the second sidewall 113 of the housing 112.

A first plate 222a of the mixer 220 which is configured to be positioned distal from the injection port 114 and adjacent to the second sidewall 113 of the housing 112 has a first length $L_1$. A second plate 222b adjacent to the first plate 222a and distal to the second sidewall 113 of the housing 112 relative to the first plate 222a has a second length $L_2$, such that the second length $L_2$ is equal to the first length $L_1$. Furthermore, a third plate 222c adjacent to the second plate 222b and distal to the second sidewall 113 relative to the second plate 222b has a third length $L_3$, such that the third length $L_3$ is equal to the first length $L_1$ and the second length $L_2$. Each of the first length $L_1$, the second length $L_2$ and the third length $L_3$ extend upstream of the mixer 220.

Furthermore, the first length $L_1$ of the first plate 222a, the second length $L_2$ of the second plate 222b and third length $L_3$ of the third plate 222c are substantially longer than the lengths $L_4$ to $L_8$ of the other plates 222d to 222h included in the plurality of plates 222. In particular embodiments, the lengths $L_4$ to $L_8$ of the other plates 222d to 222h included in the plurality of plates 222 can be equal to each other, but substantially shorter than the first length $L_1$ of the first plate 222a, the second length $L_2$ of the second plate 222b and third length $L_3$ of the third plate 222c.

A combination of the first plate 222a, the second plate 222b and the third plate 222c are configured to prevent the exhaust reductant from impacting the second sidewall 113. The exhaust reductant can be directed towards the center of the mixer 220 at the predetermined angle θ as described before. The first length $L_1$ of the first plate 222a, the second length $L_2$ of the second plate 222b and third length $L_3$ of the third plate 222c are defined such that no portion of the spray cone A of the exhaust reductant is allowed to impact the second sidewall 113 of the housing 112, thus reducing reductant deposits.

Figure 4:
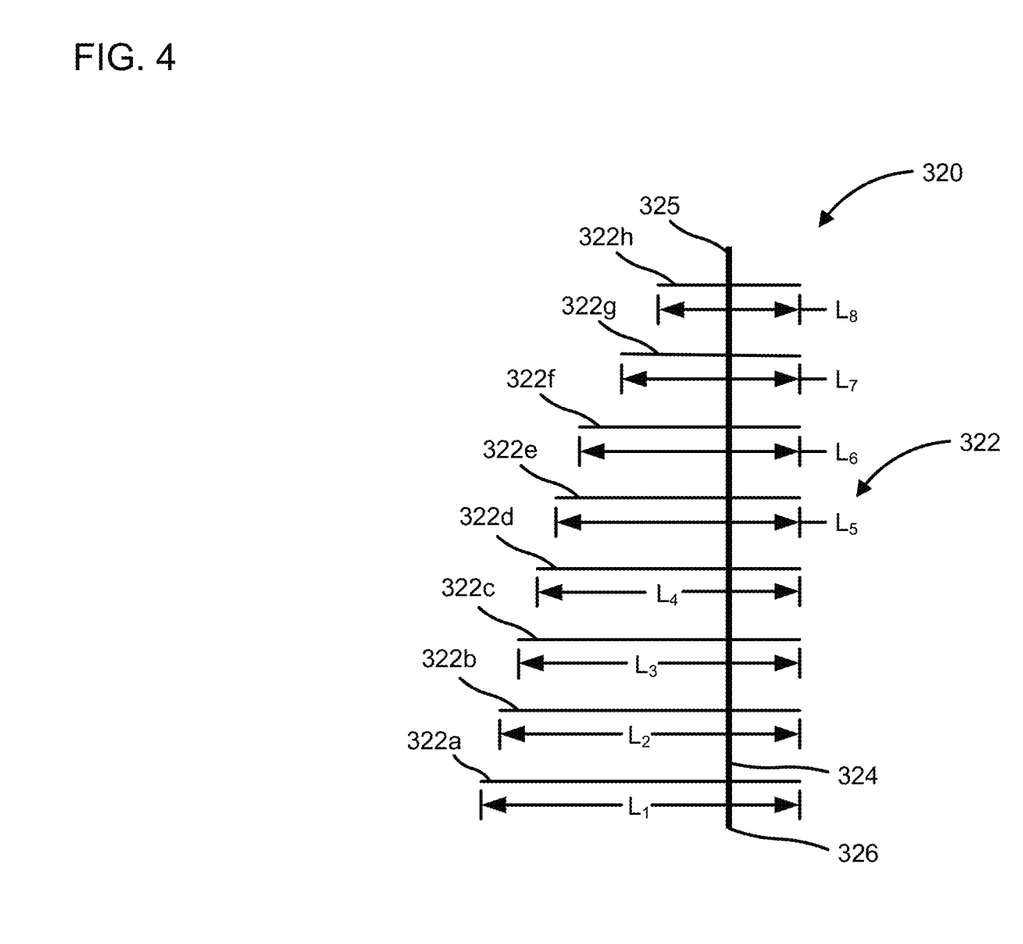
FIG. 4 is an illustration of yet another embodiment of a mixer that can be included in the mixing assembly of FIG. 1.

In still other embodiments, a mixer can include plates having cascading lengths. FIG. 4 shows yet another embodiment of a mixer 320 which can be included in the mixing assembly 110 of FIG. 1. The mixer 320 includes a plurality of plates 322. While shown as including eight plates 322a to 322h, the mixer 320 can include any number of the plates 322. A post 324 is coupled to each of the plurality of plates 322. The post 324 extends orthogonal to the plurality of plates 322. A first end 325 of the post 324 is configured to be mounted on the first sidewall 111 of the housing 112, and a second end 326 of the post 324 is configured to be mounted on the second sidewall 113 of the housing 112.

The plates 322 of the mixer 320 have cascading lengths. Expanding further, a first plate 322a of the mixer 320 which is configured to be positioned distal from the injection port 114 and adjacent to the second sidewall 113 has a first length $L_1$. A second plate 322b adjacent to the first plate 322a and distal to the second sidewall 113 of the housing 112 relative to the first plate 322a has a second length $L_2$ which is shorter than the first length $L_1$. Furthermore, a third plate 322c adjacent to the second plate 322b and distal to the second sidewall 113 relative to the second plate 322b as a third length $L_3$ which is shorter than the second length $L_2$ of the second plate 322b.

In a similar, manner lengths $L_4$ to $L_8$ of the plates 322d to 322h are subsequently shorter than the third length $L_3$ of the third plate 322c such that the length $L_8$ of the plate 322h which is configured to be positioned adjacent to the first sidewall 111 of the housing 112 has the shortest length $L_8$ and the first plate 322a, which is configured to be positioned adjacent to the second sidewall 113 has the longest length $L_1$. A combination of each of the plates 322a to 322h can thus prevent any portion of the exhaust reductant directed towards the mixer 320 at the predetermined angle θ as described above from contacting the second sidewall 113 of the mixing assembly 110, thereby reducing exhaust reductant deposits.

Figure 5A:
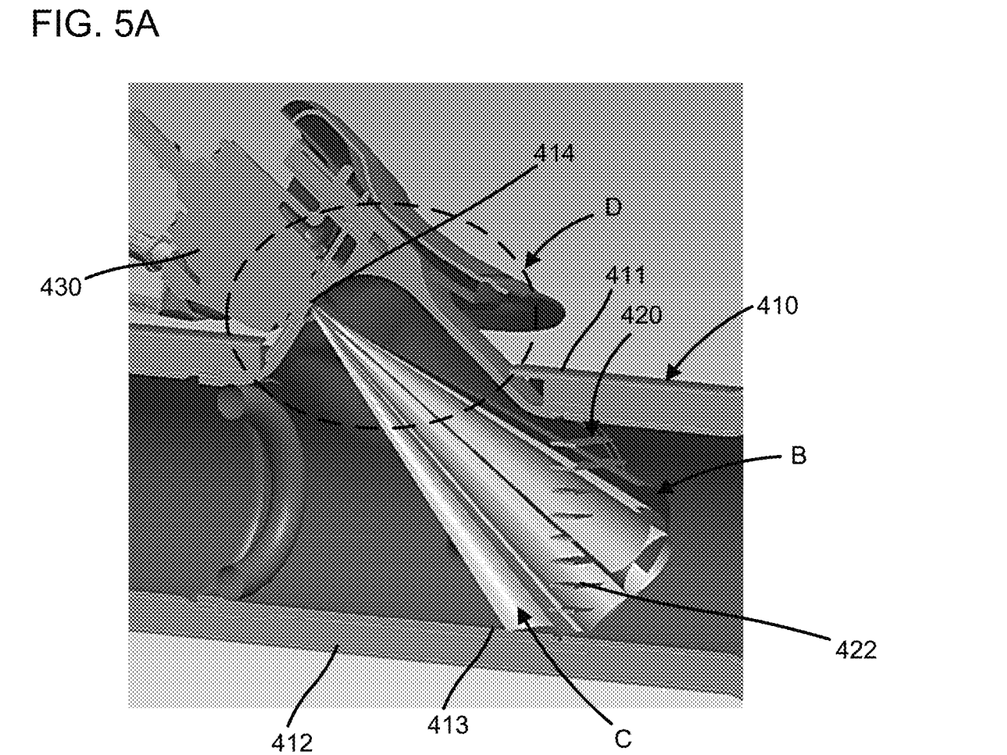
FIG. 5A is a side cross-section view of a portion of a mixing assembly that includes a mixer.
Figure 5B:
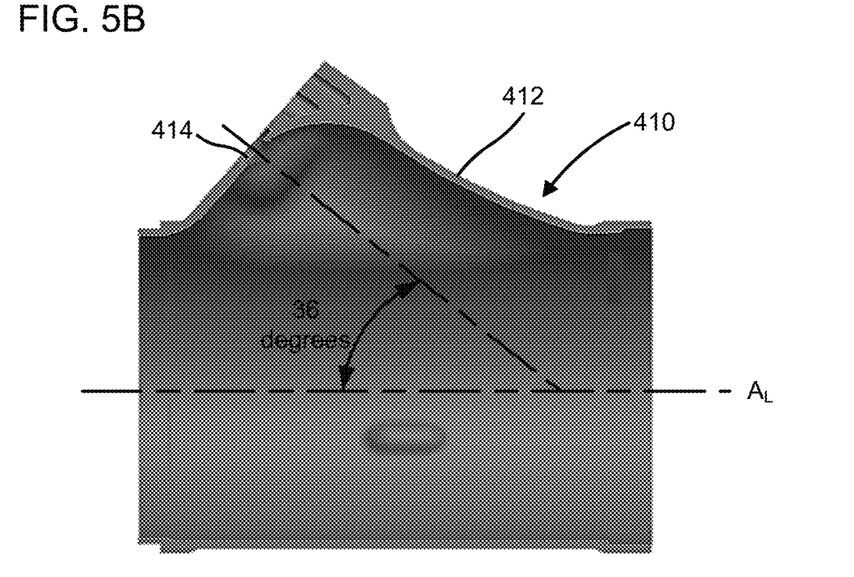
FIG. 5B is an enlarged view of a portion of the mixing assembly of FIG. 5A shown by the arrow D in FIG. 5A.

FIG. 5A shows a side cross-section of a portion of a mixing assembly 410 according to a particular embodiment. The mixing assembly 410 includes a housing 412 defining a flow path for an exhaust gas to flow therethrough. The housing 412 has a circular cross-section. An injection port 414 is defined on a first sidewall 411 of the housing 412. An exhaust reductant injector 430 is positioned on the first sidewall 411 and in fluidic communication with the flow path via the injection port 414. The injection port 414 is oriented at a predetermined angle relative to a longitudinal axis $A_L$ of the flow path (FIG. 5B).

A conventional mixer 420 is positioned within the flow path downstream of the injection port 414. The conventional mixer 420 includes a plurality of plates 422. Each of the plates 422 have the same size and are positioned parallel to each other. Furthermore, the plates 422 are equidistantly spaced from each other. FIG. 5A shows a first spray cone B (dark colored spray cone) of the exhaust reductant when the injection port 414 is oriented at an angle of 36 degrees, and a second spray cone C (light colored spray cone) of the exhaust reductant when the injection port 414 is oriented at an angle of 38 degrees relative to the longitudinal axis AL of the flow path. FIG. 5B shows an enlarged view of a portion of the mixing assembly 410 of the FIG. 5A shown by the arrow D, showing the injection port 414 oriented at an angle of 36 degrees with respect to the longitudinal axis AL.

As shown in FIG. 5A, when the injection port is 414 oriented at an angle of 38 degrees, a large portion of the spray cone C is directed towards a second sidewall 413 of the housing 412 and not towards the mixer 420. In contrast, when the injection port 414 is oriented at an angle of 36 degrees, a substantially smaller portion of the spray cone B of the exhaust reductant is directed towards the second sidewall 413 relative to the orientation angle of 38 degrees. The conventional mixer 420 can be replaced by the mixer 120, 220 or 320 described herein to prevent the portion of the exhaust reductant included in the spray cone B directed towards the second sidewall 413 from impacting the wall. In this manner, the exhaust reductant is prevented from impacting the second sidewall 413 and forming reductant deposits by orienting the injection port 414 at a predetermined angle (e.g., 36 degrees) and positioning the mixer 120, 320 or 420 in the flow path of the housing 412 downstream of the injection port 414.

Figure 6A:
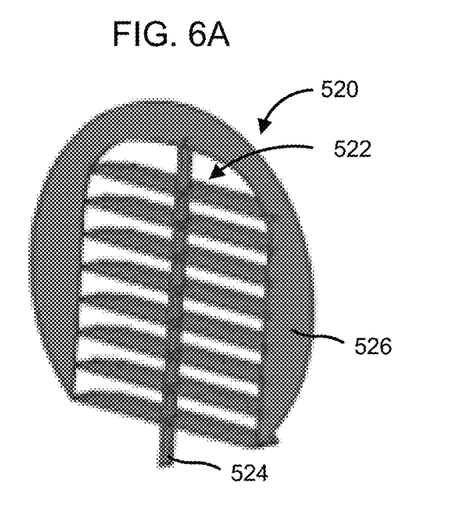
FIGS. 6A-D show various embodiments of mixers that can be included in a mixing assembly.

FIGS. 6A to 6D show various embodiments of mixers configured to be positioned within a mixing assembly having a circular cross-section. FIG. 6A shows a first mixer 520 which includes a plurality of plates 522 positioned parallel to each other and equidistantly spaced from each other. A post 524 is coupled to each of the plurality of plates 522 and extends orthogonal to the plurality of plates 522. A length of each of the plurality of plates 522 is equal to each other such that when the mixer 520 is positioned downstream of an injection port (e.g., the injection port 114 of the mixing assembly 110) none of the plates 522 extend downstream of the mixer 520. Furthermore, a width of the plates 522 is also equal to each other. A semi-circular ring 526 is positioned around the plates 522 and coupled to the post 524. In one embodiment, the edges of each of the plate 522 orthogonal to the plates 522 are coupled to the ring 526.

Figure 6B:
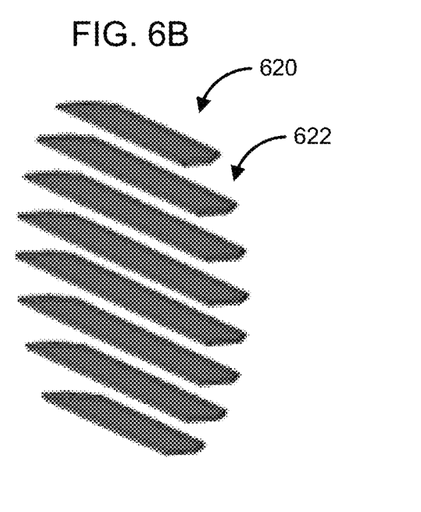

FIG. 6B shows a second mixer 620 which includes a plurality of plates 622. Each of the plates 622 are positioned parallel to each other and are equidistantly spaced from each other. The length of each of the plates 622 is equal to each other. The width of the plates 622 is varied to follow the circular contour of the mixing assembly.

Figure 6C:
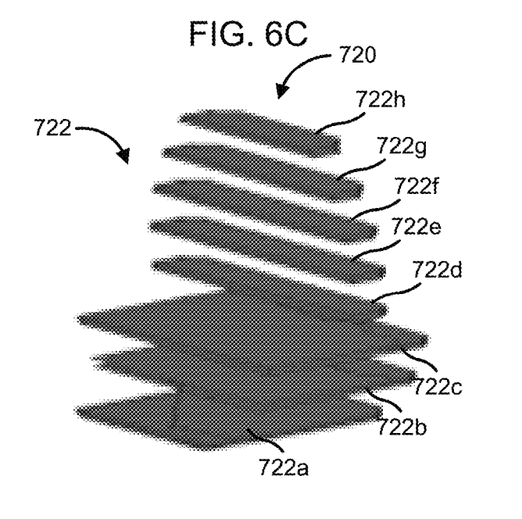

FIG. 6C shows a third mixer 720 including a plurality of plates 722 positioned parallel to and equidistantly spaced from each other. A first plate 722a configured to be positioned distal most from the injection port of the mixing assembly, a second plate 722b positioned adjacent to the first plate 722a and a third plate 722c positioned adjacent to the second plate of the plurality of plates 722 have the same length. The first plate 722a, the second plate 722b and the third plate 722c extend upstream of the mixer 720 towards the injection port. The remaining plates 722d to 722h included in the plurality of plates 722 have a same length, which is substantially shorter than the lengths of the first plate 722a, the second plate 722b and the third plate 722c. In one example embodiment, a post (see, e.g., FIG. 6D) is coupled to each of the plurality of plates 722 and is positioned orthogonal to each of the plurality of plates 722. The mixer 720 is substantially similar to mixer 220 described above herein.

Figure 6D:
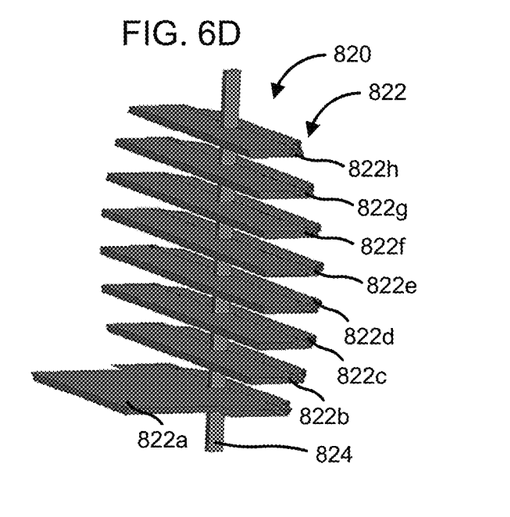

FIG. 6D shows a fourth mixer 820 which includes a plurality of plates 822 positioned parallel to and equidistantly spaced from each other. A first plate 822a configured to be positioned distal most from the injection port of the mixing assembly has a first length. The first length is substantially longer than a length of the other plates 822b to 822h included in the plurality of plates. The first plate 822a extends upstream of the mixer 820 towards the injection port. The remaining plates 822b to 822h included in the plurality of plates 822 have the same length. A post 824 is coupled to each of the plurality of plates 822 and is positioned orthogonal to each of the plurality of plates 822. The mixer 820 is substantially similar to mixer 120 described above herein.

Figure 7:
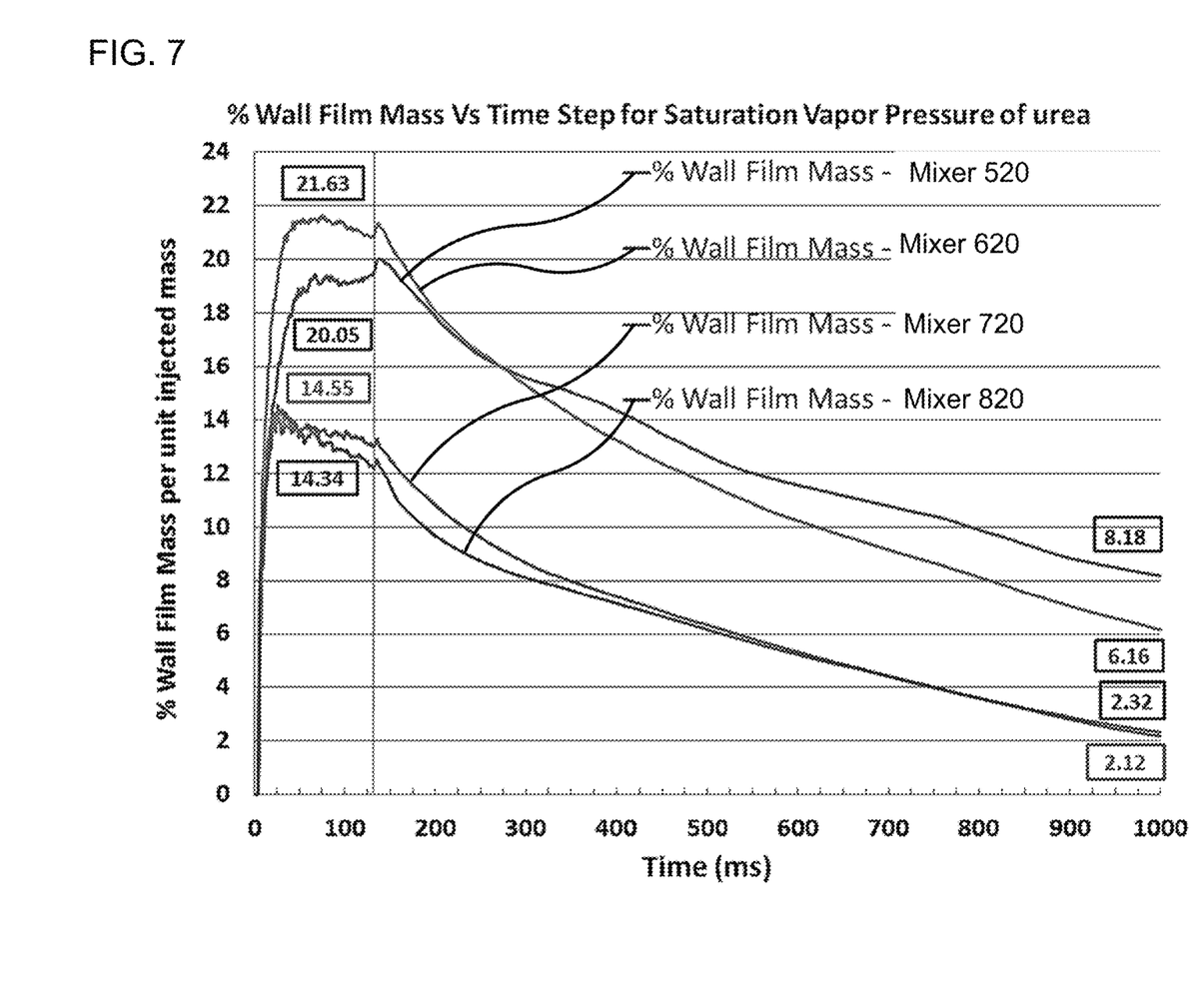
FIG. 7 are plots of % wall film mass deposited on sidewalls of a mixing assembly for each of the mixers of FIGS. 6A-D positioned within a flow path of the mixing assembly.

Each of the mixers 520, 620, 720 and 820 were tested for the amount of exhaust reductant deposits formed over a period of 1,000 seconds on an inner surface of a housing of a mixing assembly that had a circular cross-section. FIG. 7 is a plot of % wall film mass accumulation on a sidewall of the mixing assembly per unit injected mass of an aqueous urea solution as the exhaust reductant. The aqueous urea solution was injected at an angle of 36 degrees into the mixing assembly and a predetermined flow of exhaust gas was maintained through the housing.

After 1,000 seconds, the mixing assembly including the mixer 520 had a % wall film (solid deposit) mass of urea of 6.16%. Using the mixer 620, the % mass of the urea was 8.18%, with the mixer 720 the % mass of the urea was 2.32% and the lowest % mass of 2.12% was observed with the mixer 820. Therefore, the mixer 820, which includes the first plate 822a which is substantially longer than the other plates 822 of the mixer 820, provides the greatest reduction in exhaust reductant deposits on the sidewall of the housing of the mixing assembly followed by the mixer 720.

Figure 8A:
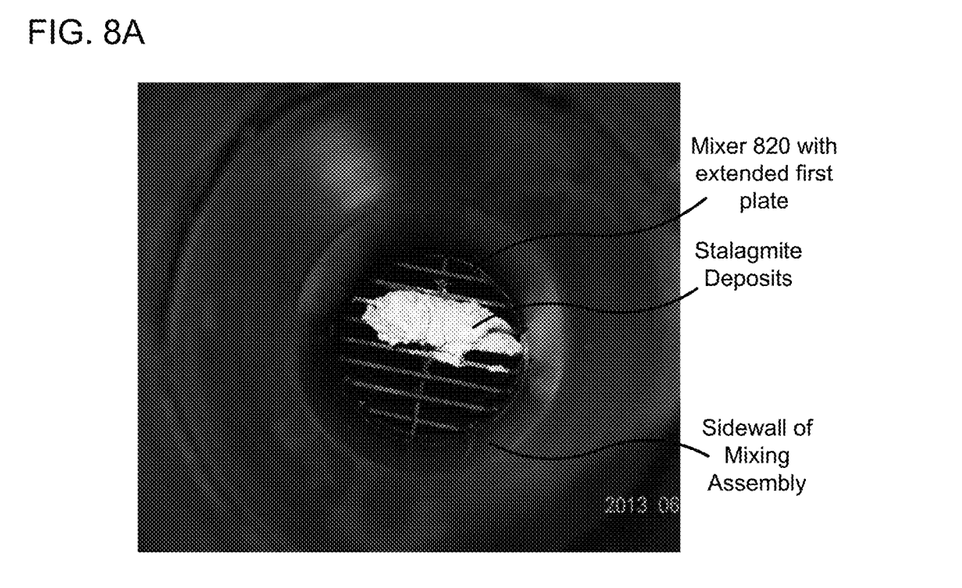
FIG. 8A is a downstream view of the mixer of FIG. 6D positioned in the flow path of a mixing assembly.
Figure 8B:
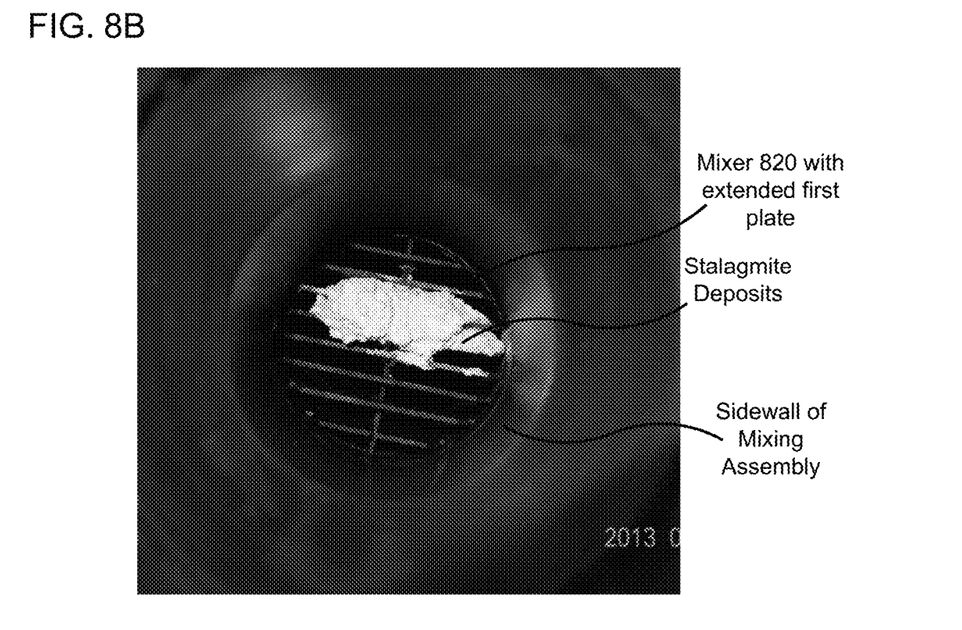
FIG. 8B is an upstream view of the mixer of FIG. 6D after operation of the mixing assembly for 6 hours on a steady state speed.

FIG. 8A is an optical image of upstream side of the mixer 820 of FIG. 6D with the extended first plate, positioned in a mixing assembly having a circular cross-section. FIG. 8B is another optical image of the mixer 820 of FIG. 8A from an upstream side of the mixer 820. Aqueous urea solution was inserted into the mixing assembly at an angle of 36 degrees and exhaust gas was caused to flow through a flow path of the mixing assembly for 6 hours. Exhaust gas was produced by an engine operating at a steady state condition at a fixed speed and torque generated urea deposits. Stalagmite deposits of the urea were deposited on the mixer 820. However no deposits are observed on a sidewall of the mixing assembly demonstrating that the mixer 820 with the extended first plate significantly reduces reductant deposits on a sidewall of the mixing assembly.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system, comprising:
    a selective catalytic reduction system configured to receive an exhaust gas, the selective catalytic reduction system including at least one catalyst formulated to reduce constituents of the exhaust gas in the presence of an exhaust reductant;
    a mixing assembly positioned upstream of the selective catalytic reduction system, the mixing assembly including:
    a housing defining a flow path for the exhaust gas to flow therethrough,
    an injection port defined on a first sidewall of the housing, the injection port oriented at a predetermined angle relative to a longitudinal axis of the flow path, and
    a mixer positioned within the flow path of the housing downstream of the injection port, the mixer including a plurality of plates each positioned in the flow path of the exhaust gas such that the plurality of plates have progressively decreasing lengths, the plurality of plates comprising a first plate positioned distal to the injection port and adjacent to a second sidewall of the housing opposite to the first sidewall, the first plate having a first length substantially longer than remaining plates of the plurality of plates, the first plate extending in a direction upstream of the mixer; and
    an exhaust reductant injector positioned on the first sidewall of the housing proximal to the injection port and in fluidic communication with the flow path via the injection port.

2. The aftertreatment system of claim 1, wherein each of the plurality of plates are positioned parallel to each other.

3. The aftertreatment system of claim 1, wherein the predetermined angle is configured to direct a flow of the exhaust reductant towards a center of the mixer so that substantially all of the exhaust reductant impacts the mixer, the mixer preventing the exhaust reductant from impacting the second sidewall of the housing.

4. The aftertreatment system of claim 3, wherein the predetermined angle is 36 degrees.

5. The aftertreatment system of claim 1, wherein the plurality of plates are equidistantly spaced.

6. The aftertreatment system of claim 1, wherein a post is coupled to each of the plurality of plates, the post extending orthogonal to the plurality of plates, a first end of the post mounted on the first sidewall and a second end of the post mounted on the second sidewall to position the plurality of plates within the flow path.

7. The aftertreatment system of claim 1, wherein the exhaust gas is a diesel exhaust gas.

8. The aftertreatment system of claim 7, wherein the exhaust reductant is a diesel exhaust fluid.

9. A mixing assembly, comprising:
a housing defining a flow path for an exhaust gas to flow therethrough;
an injection port defined on a first sidewall of the housing, the injection port oriented at a predetermined angle relative to a longitudinal axis of the flow path; and
a mixer positioned within the flow path of the housing downstream of the injection port, the mixer including a plurality of plates positioned in the flow path of the exhaust gas such that the plurality of plates have progressively decreasing lengths the plurality of plates comprising a first plate positioned distal to the injection port and adjacent to a second sidewall of the housing opposite to the first sidewall, the first plate having a first length substantially longer than remaining plates of the plurality of plates, the first plate extending in a direction upstream of the mixer.

10. The mixing assembly of claim 9, wherein each of the plurality of plates are positioned parallel to each other.

11. The mixing assembly of claim 9, wherein the predetermined angle is configured to direct a flow of exhaust reductant towards a center of the mixer so that substantially all of the exhaust reductant impacts the mixer, the mixer preventing the exhaust reductant from impacting the second sidewall of the housing.

12. The mixing assembly of claim 11, wherein the predetermined angle is 36 degrees.

13. The mixing assembly of claim 9, wherein each of the plurality of plates are equidistantly spaced.

14. The mixing assembly of claim 9, wherein a post is coupled to each of the plurality of plates, the post extending orthogonal to the plurality of plates, a first end of the post mounted on the first sidewall and a second end of the post mounted on the second sidewall to position the plurality of plates within the flow path.

15. A mixer for positioning in a mixing assembly for mixing an exhaust reductant with an exhaust gas, comprising:
a plurality of plates having progressively decreasing lengths, a first plate of the plurality of plates having a first length substantially longer than remaining plates of the plurality of plates,
wherein, the mixer is configured to be positioned in a flow path of the exhaust gas flowing through the mixing assembly such that the exhaust reductant inserted via an injection port defined on a first sidewall of a housing of the mixing assembly at a predetermined angle is directed towards a center of the mixing assembly, the first plate is located distal from the injection port and adjacent to a second sidewall of a housing of the mixing assembly opposite the first sidewall, the first plate extending in a direction upstream of the mixer.

16. The mixer of claim 15, wherein each of the plurality of plates are positioned parallel to each other.

* * * * *